United States Patent [19]

Klarer et al.

[11] Patent Number: 5,697,469
[45] Date of Patent: Dec. 16, 1997

[54] AUTOMATIC BRAKING TERMINATION ARRANGEMENT HAVING A SWITCHING ELEMENT DISPOSED ON DRIVER'S SIDE BELT LOCK

[75] Inventors: Martin Klarer, Kernen; Bernd Knoff, Esslingen; Albrecht Eckl, Stuttgart; Franz Brugger; Manfred Steiner, both of Winnenden, all of Germany

[73] Assignee: Mercedes-Benz AG, Germany

[21] Appl. No.: 449,536

[22] Filed: May 24, 1995

[30] Foreign Application Priority Data

May 24, 1994 [DE] Germany ................... 44 18 041.1

[51] Int. Cl.$^6$ ................... B60R 21/18
[52] U.S. Cl. ................... 180/268; 180/174
[58] Field of Search ................... 180/268, 170, 180/174; 188/106 R, 355; 303/3, 100

[56] References Cited

U.S. PATENT DOCUMENTS

| | | | |
|---|---|---|---|
| 4,534,441 | 8/1985 | Kanijo et al. | 180/268 |
| 4,569,536 | 2/1986 | Tsage et al. | 180/268 X |
| 4,632,208 | 12/1986 | Takayama et al. | 180/271 |
| 4,984,651 | 1/1991 | Grosch et al. | 180/268 |
| 5,201,385 | 4/1993 | Browne et al. | 180/268 |
| 5,278,764 | 1/1994 | Iizuka et al. | 180/170 X |
| 5,441,304 | 8/1995 | Zygatis et al. | 180/268 X |

FOREIGN PATENT DOCUMENTS

| | | |
|---|---|---|
| 34 13 768 C1 | 7/1985 | Germany . |
| 38 01 109 C1 | 6/1989 | Germany . |
| 40 28 290 C1 | 1/1992 | Germany . |
| 43 38 069 C1 | 11/1993 | Germany . |
| 0114537 | 5/1989 | Japan ................... 180/268 |

*Primary Examiner*—Christopher P. Ellis
*Attorney, Agent, or Firm*—Evenson, McKeown, Edwards & Lenahan, P.L.L.C.

[57] ABSTRACT

In an automatic braking procedure which can be terminated whenever the brake pedal is moved in the direction of its rest position, a braking pressure which is higher than would correspond to the pedal position of the brake pedal is generated where it is established by a triggering criterion that an emergency braking is in force. The invention ensures that an automatic braking procedure can always be aborted by the driver by the fact that, on the belt lock of the safety belt for the driver, a switching element is actuated when the locking tongue of the safety belt is engaged in the belt lock. It is thereby established whether the driver is belted-up. If the driver is not belted-up, then the execution of the automatic braking procedure is suppressed. An automatic braking procedure can only take place if the driver is belted-up. If high deceleration forces occur, then the driver is held by the safety belt and does not have to brace himself or herself. Thus, the driver can always terminate the braking procedure which is particularly necessary when the driver actuates a control pedal in a predefined manner, as constituted by the actuation of the brake pedal in the direction of its rest position—i.e. a releasing of the brake.

6 Claims, 1 Drawing Sheet

AUTOMATIC BRAKING TERMINATION ARRANGEMENT HAVING A SWITCHING ELEMENT DISPOSED ON DRIVER'S SIDE BELT LOCK

BACKGROUND AND SUMMARY OF THE INVENTION

The present invention relates to an arrangement having a switching element which is disposed in a safety belt lock disposed on the driver's seat for safely terminating an automatic braking operation.

DE 34 13 768 C1 describes an arrangement in which the triggering threshold of a passive restraint system is altered as a function of whether the driver has applied the belt or not. To this end, in the driver-side belt lock of the safety belt there is disposed a switching element which is actuated when the locking tongue is engaged in the safety belt.

Patent Application DE-P. 43 38 069.7 describes termination of an automatic braking procedure at least whenever the brake pedal is moved in the direction of its rest position. An example of just such an automatic braking procedure is described in DE 40 28 290 C1 where the servo brake system is fully modulated by an electric valve. A corresponding brake pressure is generated whenever it is established, by the fulfillment of a triggering criterion, that an emergency braking is in force. The automatic braking procedure is terminated whenever an abort criterion is satisfied.

It has found to be a drawback, however, that an abort by the driver is difficult where the automatic braking procedure is triggered against his expectations. When the automatic braking procedure is executed, this can result in high vehicle deceleration forces, so that there is a danger of the driver bracing himself with his foot on the brake pedal insofar as he is not restrained by the safety belt. He is then no longer in a position to terminate the automatic braking procedure by releasing the brake.

An object of the present invention is to ensure that an automatic braking procedure can always be aborted by the driver. This object has been achieved in accordance with the present invention by providing an arrangement with a control unit associated with the switching element for executing an automatic braking procedure. At least one signal line is arranged to transmit signals to the control unit, and at least one control element is operatively commanded by the control unit via a connecting line.

More specifically, a switching element is arranged on the belt lock of the safety belt for the driver so as to be actuated when the locking tongue of the safety belt is engaged in the belt lock. It is thereby established whether the driver is belted-up. If the driver is not belted-up, then the execution of the automatic braking procedure is suppressed. An automatic braking procedure can therefore only take place if the driver is belted-up so that, if high deceleration forces occur, then the driver is held by the safety belt and does not have to brace himself. Consequently, it is always possible for the driver to terminate the braking procedure. This is particularly necessary where the automatic braking procedure is terminated when the driver actuates an accelerator pedal in a predefined manner, as constituted by the actuation of the brake pedal in the direction of its rest position—i.e. a releasing of the brake.

According to a further embodiment, the suppression of the execution of the automatic braking procedure is linked not only to the position of the switching element in the belt lock. A speed signal is also used, so that it is possible to prevent the automatic braking procedure only when the driver is not belted-up and the vehicle speed exceeds a limit value. This has the advantage that the automatic braking procedure, at low vehicle speeds at which high deceleration forces do not occur for any undue length of time, can still be executed in spite of the driver not being belted-up.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
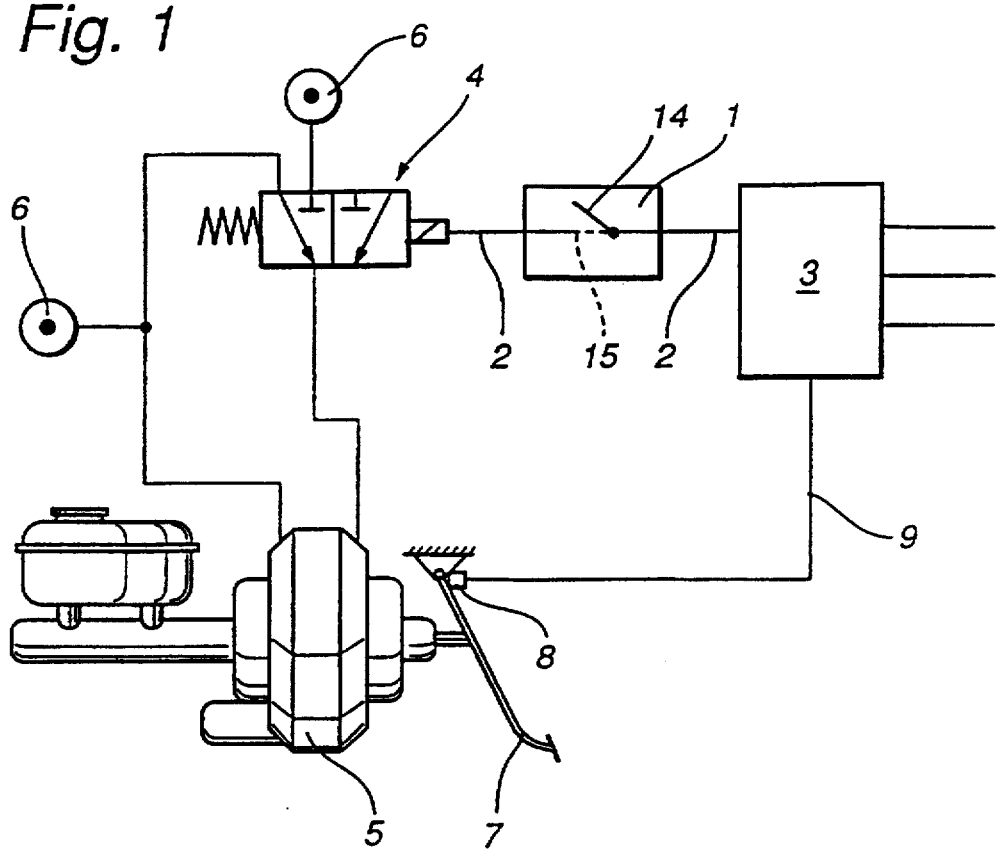
FIG. 1 is a schematic circuit diagram of a first embodiment of an arrangement according to the present invention.

Referring now to FIG. 1, the switching element 1, which is disposed on the driver side in the belt lock of the safety belt, is herein disposed as a contact-breaker in the connecting line 2 between the control unit 3 and control element 4. The connecting line 2 is interrupted for as long as the switching element 1 in the belt lock is not actuated, i.e. in its rest position 14, such as where the driver is not belted-up. The switching element 1 is actuated when the locking tongue attached to the safety belt is engaged in the belt lock such as where the driver is belted-up. The locking element is then in its switch position 15 (dotted lines).

In the illustrated embodiment, the control element 4 is a 3/2-way valve which switches the fluidic connection between the two chambers of a servo brake system 5 and pressure sources 6. The control element 4 cannot be actuated by the control unit 3 for as long as the connecting line 2 is interrupted. The control element 4 is thus in its rest position, as is necessary for normal brake actuation, and ensures that an automatic braking procedure does not take place.

If the connecting line 2 is uninterrupted, i.e. the switching element in the belt lock is actuated, then, if as the control unit 3 generates a corresponding signal, the control element 4 is actuated and hence the automatic braking procedure induced.

A sensor 8 on the brake pedal 7 is connected by the signal line 9 to the control unit 3. The sensor 8 establishes, for example, that the brake pedal is to be moved in the direction of its non-actuated or rest position. If a procedure of this kind is established during an automatic braking procedure, then the braking procedure is terminated by the control unit 3.

Figure 2:
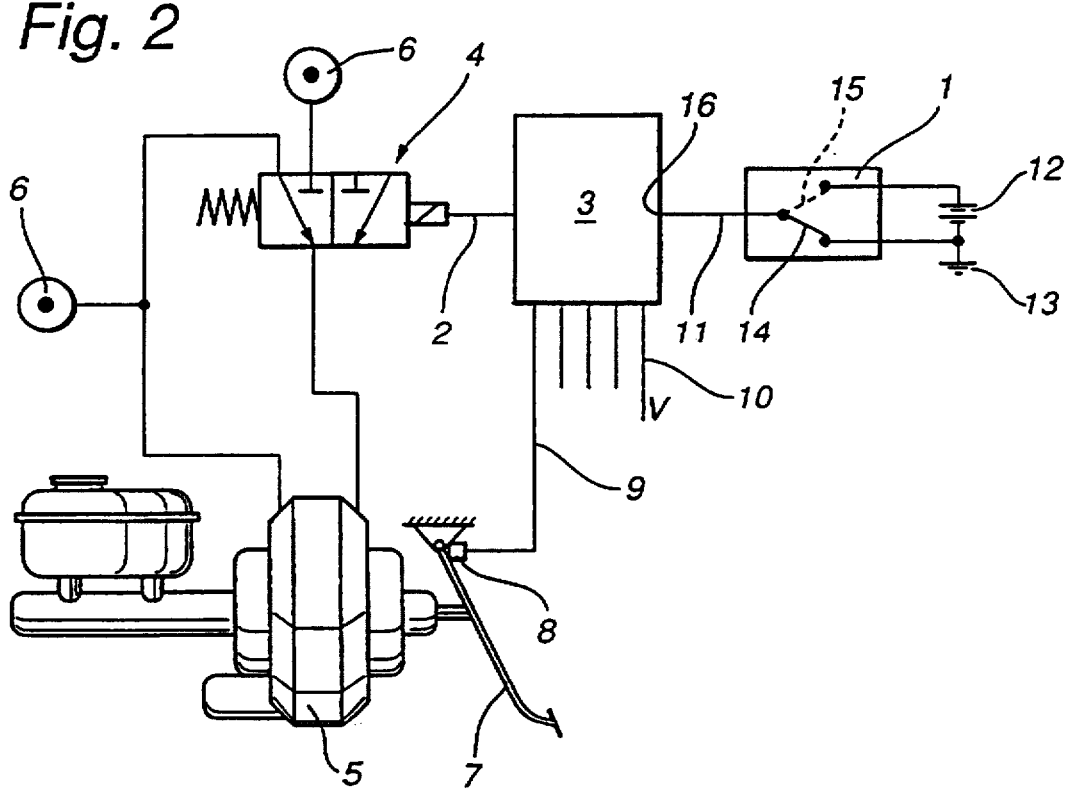
FIG. 2 is a schematic circuit diagram similar to FIG. 1 but a second embodiment of an arrangement according to the present invention.

FIG. 2 shows a second embodiment of an arrangement according to the present invention. The control unit 3 is fed, via the signal line 10, a signal representing the speed v of the vehicle. By way of the connecting line 2, the control unit 3 is permanently connected to the control element 4. The control element 4 can thus be actuated by the control unit 3 at any time. Alternatively to the arrangement shown in the drawings, the control element 4 can also be disposed in the servo brake system 5 or can even be integrated within the operating components of the servo brake system 5. In any event, upon actuation, the chambers of the servo brake system 5 are connected to other pressure sources 6, as is the case in a ready-to-brake rest position. If, by actuation of the control element 4, an automatic braking procedure has been induced, then this is terminated at least where the sensor 8 transmits, via the signal line 9, a signal representing an actuation of the brake pedal 7 in the direction of its rest position 14. For the arrangement of the sensor 8 on the brake pedal 7 there can also be substituted any other attachment point which is suitable for establishing a corresponding motion of the brake pedal 7. An arrangement in the region of the control part of the servo brake system 5 is particularly suitable in this regard.

The switching element 1 disposed in the belt lock in FIG. 2 is connected by the signal line 11 to the control unit. The input 16 of the control unit 3 is connected by the switching element 1 to ground 13 for as long as the switching element 1 is in its non-actuated rest position 14 such as where the driver is not belted-up, i.e. where the locking tongue is not engaged in the belt lock.

If the switching element 1 is actuated by locking engagement of the locking tongue in the belt lock, then the switching element passes into its switch position 15. The voltage of the voltage source 12 is then present at the input 16 of the control unit.

In the control unit 3, a check is made, at least where the at least one triggering criterion for the automatic braking procedure is satisfied, as to whether the voltage of the voltage source 12 is present on the input 16, i.e. as to whether the driver is belted-up. If the voltage is present, then the control element 4 can be actuated via the connecting line 2 and hence the automatic braking procedure induced.

If the voltage of the voltage source 12 is not present on the input, however, then a check is made as to whether the speed signal on the signal line 10 represents a speed in excess of a speed threshold value. If an excess speed is detected, then the control element 4 fails to be actuated and the automatic braking procedure is not induced. Only if the speed has not exceeded the speed threshold value is the control element 4 actuated via the connecting line 2 and the automatic braking procedure induced.

As the speed threshold value, a value ranging between 0 km/h and the maximum permissible vehicle speed in urban traffic—generally 50 or 60 km/h—can herein be adopted. In particular, values between 20 km/h and 40 km/h are reasonable. This then ensures that the automatic braking procedure can still be executed, in spite of the driver not being belted up, in the frequent event of emergency situations arising involving unprotected cyclists and pedestrians as road users.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement comprising a switching element disposed in a belt lock of a safety belt on a driver's seat, the switching element configured to be in a rest position when the safety belt is not operative and in a switch position only when the belt is operative, a control unit associated with the switching element for executing a vehicle automatic braking procedure during vehicle movement to effect sufficiently high deceleration, at least one signal line arranged to transmit signals to the control unit, and at least one control element, which is operatively commanded by the control unit via a connecting line.

2. The arrangement according to claim 1, wherein the switching element is a contact-breaker operatively arranged in the connecting line, such that the connecting line is uninterrupted when the switching element is in the switch position.

3. The arrangement according to claim 1, wherein the control unit is arranged to be fed, via a signal line, an input signal corresponding selectively to the switch position and the rest position of the switching element.

4. The arrangement according to claim 3, wherein the automatic braking procedure is untriggered in the control unit when the input signal thereto represents the rest position of the switching element.

5. The arrangement according to claim 3, wherein the control unit is arranged to be fed a speed signal representing the vehicle speed and not to trigger the automatic braking procedure when the speed has exceeded a speed threshold value and the input signal represents the rest position of the switching element.

6. The arrangement according to claim 1, wherein a sensor is operatively associated with a brake pedal to establish at least a motion of the brake pedal in a rest position direction thereof, and a signal generated by the sensor is arranged to be fed to the control unit.

* * * * *